United States Patent
Beaury et al.

(10) Patent No.: US 9,627,898 B2
(45) Date of Patent: Apr. 18, 2017

(54) DEVICE AND METHOD FOR TRANSMITTING ENERGY AND DATA BETWEEN A CONTROL UNIT AND A POSITION-MEASURING DEVICE

(71) Applicant: Dr. Johannes Heidenhain GmbH, Traunreut (DE)

(72) Inventors: Bernhard Beaury, Rimsting (DE); Hermann Hofbauer, Trostberg (DE); Markus Mooshammer, Traunstein (DE); Erich Strasser, Trostberg (DE); Ernst Thielicke, Traunstein (DE); Sebastian Tondorf, Waging am See (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 1000 days.

(21) Appl. No.: 13/859,926

(22) Filed: Apr. 10, 2013

(65) Prior Publication Data
US 2013/0265000 A1    Oct. 10, 2013

(30) Foreign Application Priority Data
Apr. 10, 2012 (DE) .......... 10 2012 205 802

(51) Int. Cl.
*H02J 7/00* (2006.01)
*H04B 7/216* (2006.01)
(Continued)

(52) U.S. Cl.
CPC ............ *H02J 7/0042* (2013.01); *H04B 3/548* (2013.01); *H04L 12/10* (2013.01);
(Continued)

(58) Field of Classification Search
CPC ..................................................... H02J 7/0042
(Continued)

(56) References Cited

U.S. PATENT DOCUMENTS

| 5,687,103 A | 11/1997 | Hagl et al. |
| 7,289,438 B2 * | 10/2007 | Wastlhuber .......... G05B 19/042 |
| | | 370/229 |

(Continued)

FOREIGN PATENT DOCUMENTS

| DE | 10 2008 027 902 | 12/2009 |
| EP | 0 386 659 | 9/1990 |

(Continued)

OTHER PUBLICATIONS

European Search Report, dated Jul. 18, 2013, issued in corresponding European Patent Application No. 13154379.5.

*Primary Examiner* — Edward Tso
*Assistant Examiner* — Ahmed Omar
(74) *Attorney, Agent, or Firm* — Andrews Kurth Kenyon LLP

(57) ABSTRACT

In a device and a method for transmitting energy and data between a control unit and a position-measuring device via a line pair, the energy transmission takes place in a charge mode and the data transmission takes place in a communication mode, and an energy storage device is provided in the position-measuring device, which is able to be charged in the charge mode via the line pair, and which is able to supply energy to the position-measuring device in the communication mode, and a charge unit and a switching device are provided in the control unit. The switching unit is adapted to the charge unit to the line pair in two-pole manner.

11 Claims, 3 Drawing Sheets

(51) Int. Cl.
*H04J 1/00* (2006.01)
*H04B 3/54* (2006.01)
*H04L 12/10* (2006.01)
*H04L 12/40* (2006.01)

(52) U.S. Cl.
CPC ............ *H04L 12/40045* (2013.01); *H04B 2203/5404* (2013.01); *H04B 2203/547* (2013.01); *H04B 2203/5445* (2013.01)

(58) Field of Classification Search
USPC ........................................................ 320/107
See application file for complete search history.

(56) References Cited

U.S. PATENT DOCUMENTS

| | | | |
|---|---|---|---|
| 8,143,856 B2* | 3/2012 | Andrea | H02M 7/797 320/109 |
| 8,401,595 B2* | 3/2013 | Zhu | H04B 1/1607 307/66 |
| 8,402,175 B2* | 3/2013 | Hwang | H04M 1/72527 327/524 |
| 8,872,476 B2* | 10/2014 | Huang | H02J 7/045 320/116 |
| 2005/0248440 A1 | 11/2005 | Stevens | |
| 2011/0116501 A1* | 5/2011 | Beaury | H04L 25/4904 370/389 |
| 2012/0119694 A1* | 5/2012 | Carpenter | H02J 7/0068 320/107 |
| 2012/0200251 A1* | 8/2012 | Chishima | H02J 7/045 320/107 |
| 2013/0141034 A1* | 6/2013 | Huang | H02J 7/045 320/107 |

FOREIGN PATENT DOCUMENTS

| | | |
|---|---|---|
| EP | 0 660 209 | 6/1995 |
| EP | 1 372 270 | 12/2003 |
| GB | 2 484 727 | 4/2012 |
| WO | 2011/036147 | 3/2011 |

\* cited by examiner

DEVICE AND METHOD FOR TRANSMITTING ENERGY AND DATA BETWEEN A CONTROL UNIT AND A POSITION-MEASURING DEVICE

CROSS-REFERENCE TO RELATED APPLICATIONS

The present application claims priority to Application No. 10 2012 205 802.8, filed in the Federal Republic of Germany on Apr. 10, 2012, which is expressly incorporated herein in its entirety by reference thereto.

FIELD OF THE INVENTION

The present invention relates to a device for transmitting energy and data between a control unit and a position-measuring device, and to a method for transmitting energy and data between a control unit and a position-measuring device. With the aid of such a device or a method, a position-measuring device is able to be operated from a control unit using a single line pair.

BACKGROUND INFORMATION

Position-measuring devices which provide digital absolute positional values are being used more and more in the field of automation technology. Frequently, such position-measuring devices are also able to be programmed, i.e., they include memory units from which memory content is able to be read or to which memory content can be written. Memory content could be calibration data or configuration data, for example. Moreover, sensors for measuring additional parameters may also be included in the position-measuring device, for example, to measure the temperature. Digital data, especially the absolute positional values, are predominantly transmitted via serial data interfaces, since they are able to operate with relatively few data-transmission lines and yet achieve high data-transmission rates.

An important cost factor when connecting position-measuring devices to a control unit, e.g., a machine tool control unit, is the number of electric lines required for the operation, since this number significantly defines the price of the utilized high-quality data cables. For example, conventional synchronous-serial interfaces allowing a differential signal transmission (e.g., according to the RS-485 standard) require two lines in each case for the transmission of clock and data signals. Two further lines must be provided to supply the position-measuring device with energy. In other words, a total of six lines is required. An example in this regard is described, for instance, in European Patent No. 0 660 209.

In an effort to reduce the number of required lines while maintaining the differential signal transmission, which is especially advantageous because of its low interference susceptibility and the high achievable data transmission rates, German Published Patent Application No. 10 2008 027 902 describes dispensing with the transmission of a clock signal and implementing the data transmission via only one bidirectionally operated line pair. In other words, counting the lines for the energy supply, the lines are reduced to only four.

SUMMARY

Example embodiments of the present invention provide a device for transmitting energy and data between a position-measuring device and a control unit, in which the number of lines required for the operation is reduced even further and which also allows a differential data transmission.

According to example embodiments of the present invention, a device for transmitting energy and data between a control unit and a position-measuring device via only a single line pair is provided, in which the energy transmission takes place in charge mode and the data transmission takes place in communication mode. In addition, an energy storage device is provided in the position-measuring device, which is able to be charged via the line pair in the charge mode and is able to supply energy to the position-measuring device in the communication mode. A charge unit and a switching device are arranged in the control unit, and by the switching device, the charge unit is able to be connected to the line pair in the charge mode in a two-pole manner.

Example embodiments of the present invention provide a method for transmitting energy and data between a position-measuring device and a control unit, in which the number of lines required for the operation is able to be reduced further and which also allows a differential data transmission.

For example, a method for transmitting energy and data between a control unit and a position-measuring device via only a single line pair is provided, in which the transmission of energy takes place in a charge mode, and the transmission of data takes place in a communication mode. An energy storage device is provided in the position-measuring device, which is charged via the line pair in the charge mode and which is used to supply the position-measuring device with energy in the communication mode. Moreover, a charge unit and a switching device are provided in the control unit, and by the switching device, the charge unit is connected to the line pair in a two-pole manner in the charge mode.

Further features and aspects of example embodiments of the present invention are described in more detail below with reference to the appended Figures.

DETAILED DESCRIPTION

Figure 1:
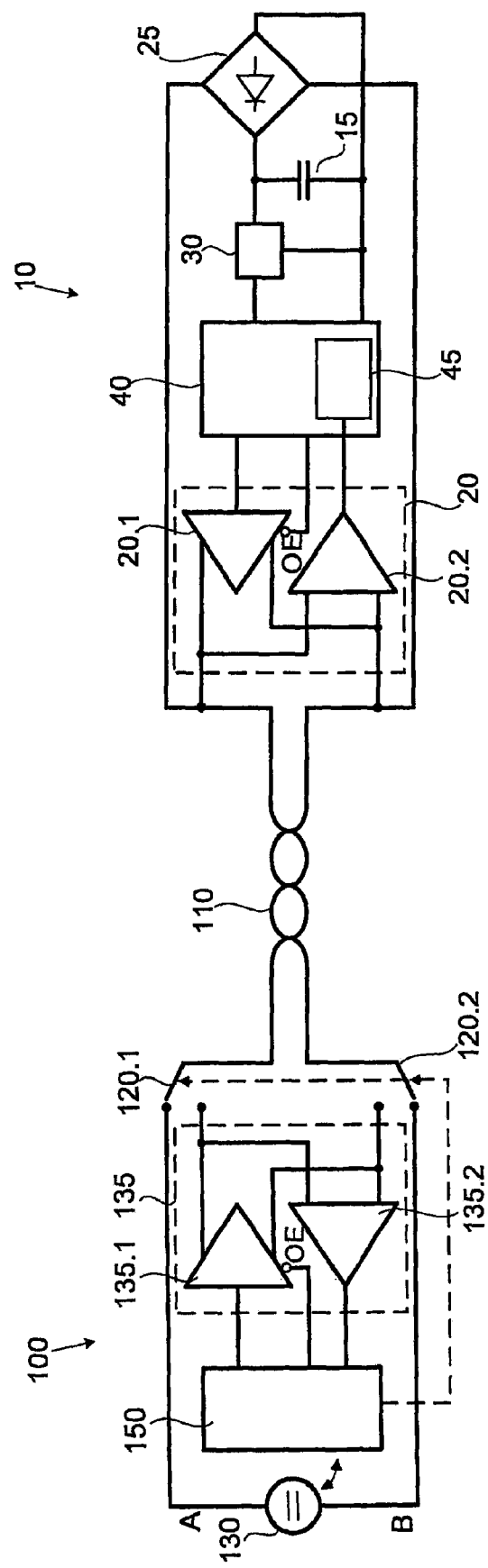
FIG. 1 a block diagram of a device according to an example embodiment of the present invention.

FIG. 1 is a block diagram of a device for transmitting energy and data between a position-measuring device 10 and a control unit 100 using a single line pair 110.

According to example embodiments of the present invention, energy is transmitted to position-measuring device 10 in a charge mode via single line pair 110, and the energy is stored therein an energy storage device 15, which may include a capacitor, e.g., a ceramic capacitor or an electrolyte capacitor. In a communication mode, a communication between control unit 100 and position-measuring device 10 takes place, likewise via line pair 110. In the communication mode, position-measuring device 10 is supplied with energy from energy storage device 15.

For the switch between charge and communication mode, a switching device in the form of switching elements 120.1, 120.2 is provided on the side of control unit 100, via which switching device line pair 110 is connectable to a charge unit 130 in the charge mode. Electronic switches, e.g., MOSFET transistors, may be used as the switching elements 120.1, 120.2.

In an uncomplicated case, charge unit 130 is a power-supply unit, or a supply voltage delivered by a central power supply unit, which, for example, also serves as supply of other components in control unit 100. In addition, a current-limitation circuit and/or fuse may be provided in order to restrict or switch off the output current in the event of a fault. Moreover, charge unit 130 may also provide additional functions, such as the option of switching the polarity of the charge voltage output to position-measuring device 10.

A communication unit 135 is provided for the communication with position-measuring device 10 by line pair 110. It includes a differential transmission module 135.1, as well as a differential receiver module 135.2, which are switched such that a bidirectional data exchange is possible. For this purpose a release line OE, by which the output of transmitter module 135.1 is able to be activated/deactivated, is provided on transmitter module 135.1, for example. Transmitter module 135.1 and receiver module 135.2 correspond to the specification of the RS-485 standard, for example.

In the example illustrated, switching elements 120.1, 120.2 are arranged as changeover switches, so that communication unit 135 is separated from line pair 110 in the charge mode. It should be noted that this is not mandatory. For example, if the input circuit of communication unit 135 is dimensioned such that the maximum voltage to be expected in charge mode is within the tolerance range of the input voltage of communication unit 135, then communication unit 135 may remain connected to line pair 110 during the charge mode as well. Switch elements 120.1, 120.2 may be arranged as simple contacts in such a case.

To control all sequences, control unit 100 includes a central processing unit 150. Processing unit 150, for example, controls the communication between control unit 100 and position-measuring unit 10 (transmission of commands and possibly data to communication unit 135, the reception and processing of data from communication unit 135, the setting of the data direction of communication unit 135 by activating/deactivating transmitter module 135.1) as well as the switchover between the charge and communication modes. In addition, processing unit 150 controls the charge operation of energy storage device 15 by actuating charge unit 130 and by switching the switching elements 120.1, 120.2, if appropriate.

Processing unit 150 may be arranged as a highly integrated programmable module, either entirely or partially, e.g., as FPGA, and may also include a microprocessor or microcontroller.

A communication unit 20, whose structure is generally similar to that of communication unit 135 on the control side is also included in position-measuring device 10. As a result, it includes a differential transmitter module 20.1 and a differential receiver module 20.2. Transmitter module 20.1 may once again be activated/deactivated via a release line OE. In this exemplary embodiment, communication unit 20 on the side of the measuring device is dimensioned such that the maximum charge voltage that reaches position-measuring device 10 in the charge mode is within the input voltage range of communication unit 20. This is considered advantageous for two reasons. For one, communication unit 20 may remain connected to line pair 110 during charge mode as well, which means that no switches have to be provided to separate communication unit 20 from line pair 110 in charge mode. For another, receiver module 20.2 converts the charge voltage into a digital signal, which may be used in position-measuring device 10 for detecting the transition from charge mode to communication mode, which will be described in greater detail below.

To charge energy storage device 15, a rectifier unit 25 is provided in position-measuring device 10, whose input is connected to line pair 110 and whose output is connected to energy storage device 15. Rectifier unit 25 may be configured as a bridge rectifier, so that charging of energy storage device 15 takes place regardless of the polarity of the charge voltage. Apart from that, during the differential data transmission on line pair 110 in communication mode, the bridge rectifier acts like a two-pole deactivator of rectifier unit 25 from line pair 110 because all diodes of the bridge rectifier are operating in the inverse direction in relation to line pair 110 connected thereto.

A voltage-conversion unit 30 is postconnected to energy storage device 15, which uses the voltage of energy storage device 15, which is subject to fluctuations as a matter of principle, in order to generate at least one stable supply voltage for a central position-detection unit 40. A DC/DC converter, for example, may be used as voltage-conversion unit 30.

Position-detection unit 40 includes all functional units of position-measuring device 10 that are required in order to generate measured values and to control the communication with control unit 100, such as detectors for measuring position-dependent signals generated by scanning a measuring standard; a signal-processing unit to correct, condition, and convert the position-dependent signals into digital positional values; an interface unit to communicate with control unit 100 via communication unit 20, especially for the purpose of transmitting the digital positional values to control unit 100. In addition, there may also be memory units which are able to be read and/or programmed by control unit 100. Examples of such functional units can be found in the European Patent No. 0 660 209, for example, which is expressly incorporated herein in its entirety by reference thereto.

Since continuous switching between charge mode and communication mode takes place during normal operation of position-measuring device 10, an evaluation unit 45 is provided in position-detection unit 40. The evaluation unit 45 analyzes the digital signals arriving in position-detection unit 40 from receiver unit 20.2 and detects the instant of the switchover from charge mode to communication mode by detecting specific signal patterns. This makes it possible to deactivate functional units of position-detection unit 40 that are not required in charge mode at the conclusion of the communication mode, or to put them into an energy-saving mode and reactivate them again only when evaluation unit 45 signals the end of charge mode. This makes it possible to reduce the current consumption of position-measuring device 10 significantly, which has a very advantageous effect on the dimensions of the energy storage device.

Position-detection device 40 may be implemented as a highly integrated component, either completely or partially, for example, as FPGA or ASIC, and it may include a microprocessor or microcontroller among other components.

The communication between central processing unit 150 in control unit 100 and position-detection unit 40 in position-measuring device 10 via control-side communication unit 135, line pair 110 and communication unit 20 in position-measuring device 10 during communication mode may be carried out as described in German Published Patent Application No. 10 2008 027 902, for example, which is expressly incorporated herein in its entirety by reference thereto.

It should be noted, for example, that control unit 100 supplies no electrical reference potential (mass potential) to the electrical circuit of position-measuring device 10 during communication mode in a device as described herein. This is simply due to the fact that the single electrical connection between control unit 100 and position-measuring device 10 is line pair 110, which is used exclusively for the differential data transmission during the communication mode. As a result, position-measuring device 10 behaves like a battery-operated device during the communication mode. Certain problems, such as the irradiation of interference signals on the supply voltage, as well as ground loops, are therefore unable to occur as a matter of principle.

Figure 2:
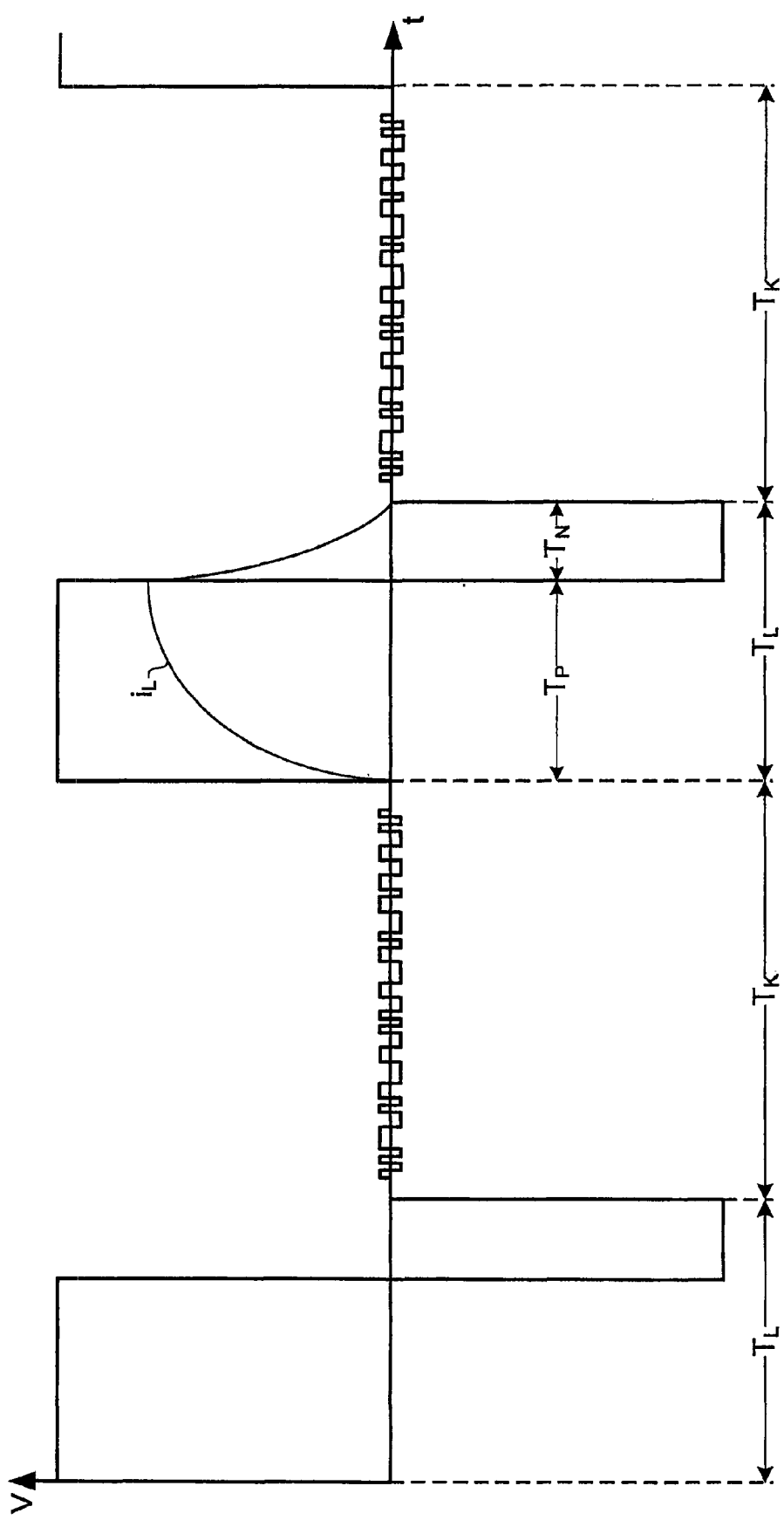
FIG. 2 is a signal diagram illustrating signal curves of the voltages on a line pair.

FIG. 2 shows a simplified signal characteristic of the voltages between the lines of line pair 110. During the times denoted by $T_L$, the device operates in the charge mode, whereas during the times denoted by $T_K$, the device is in the communication mode. In the second illustrated charge mode, charge current $i_L$ is shown in addition, in an idealized form. Both the signal amplitudes and the pulse widths are not true to scale and are simply meant for illustrative purposes.

As illustrated in FIG. 2, charge mode is subdivided into two phases, i.e., a phase $T_P$ during which a positive voltage is applied at line pair 110, and a phase $T_N$ during which a negative voltage is applied at line pair 110. This particular signal routing is considered advantageous because line pair 110 acts inductively as well. This means that a switchoff of the charge voltage at an instant at which a significant charge current $i_L$ is still flowing results in a counter-induction voltage, which may reach a considerable amplitude that may possibly even have a destructive effect. On the other hand, since the charge mode should take up as little time as possible, so that the time gap between two communication modes (which corresponds to the time gap between two position queries by control unit 100 from position-measuring device 10), is as short as possible, it is also not practical to prolong the charge mode until the charge current of energy storage device 15 has dropped to a non-critical value. The polarity reversal of the charge voltage following time $T_P$ causes a controlled drop in charge current $i_L$, which features a zero crossing after time $T_N$ has elapsed. This constitutes the optimal instant for switching off the charge voltage since no counter-induction voltage is to be expected without a current flow.

In general, to achieve a short duration of the charge mode, it may therefore be said that at least one polarity reversal of the charge voltage is advantageous in the charge mode, so that a zero crossing of charge current $i_L$ is able to be achieved, which then is used as trigger for switching off the charge voltage.

As mentioned above, the output signal from receiver module 20.2 of communication unit 20 is forwarded to evaluation unit 45 of position-measuring device 10. Since it converts the differential voltages on line pair 110 into simple digital signals, it also assigns different logical levels to the different polarities of the charge voltage. As a result, evaluation unit 45 is able to detect the end of charge mode by analyzing the time characteristic of the digital signals, since the time periods of phase $T_P$ and phase $T_N$ of the charge mode differ both from each other and also considerably from the pulse durations of the data-transmission signals in the communication mode. This makes it possible to reactivate units of position-detection unit 40 that were switched off in preparation for the communication mode, or to terminate the energy-saving mode.

As an alternative, the signals between the lines of line pair 110 (i.e., the charge voltage in the charge mode, or the data signals in the communication mode) may be forwarded to evaluation unit 45 directly, and the end of the charge mode be detected by analyzing the voltage levels.

The instant at which a switch from the communication mode to the charge mode is able to take place is defined by the end of the data transmission. This may be detected in precise manner on the basis of the data-transmission protocol of the interface used, which is known both to central processing unit 150 of control unit 100, and to position-detection unit 40.

Figure 3:
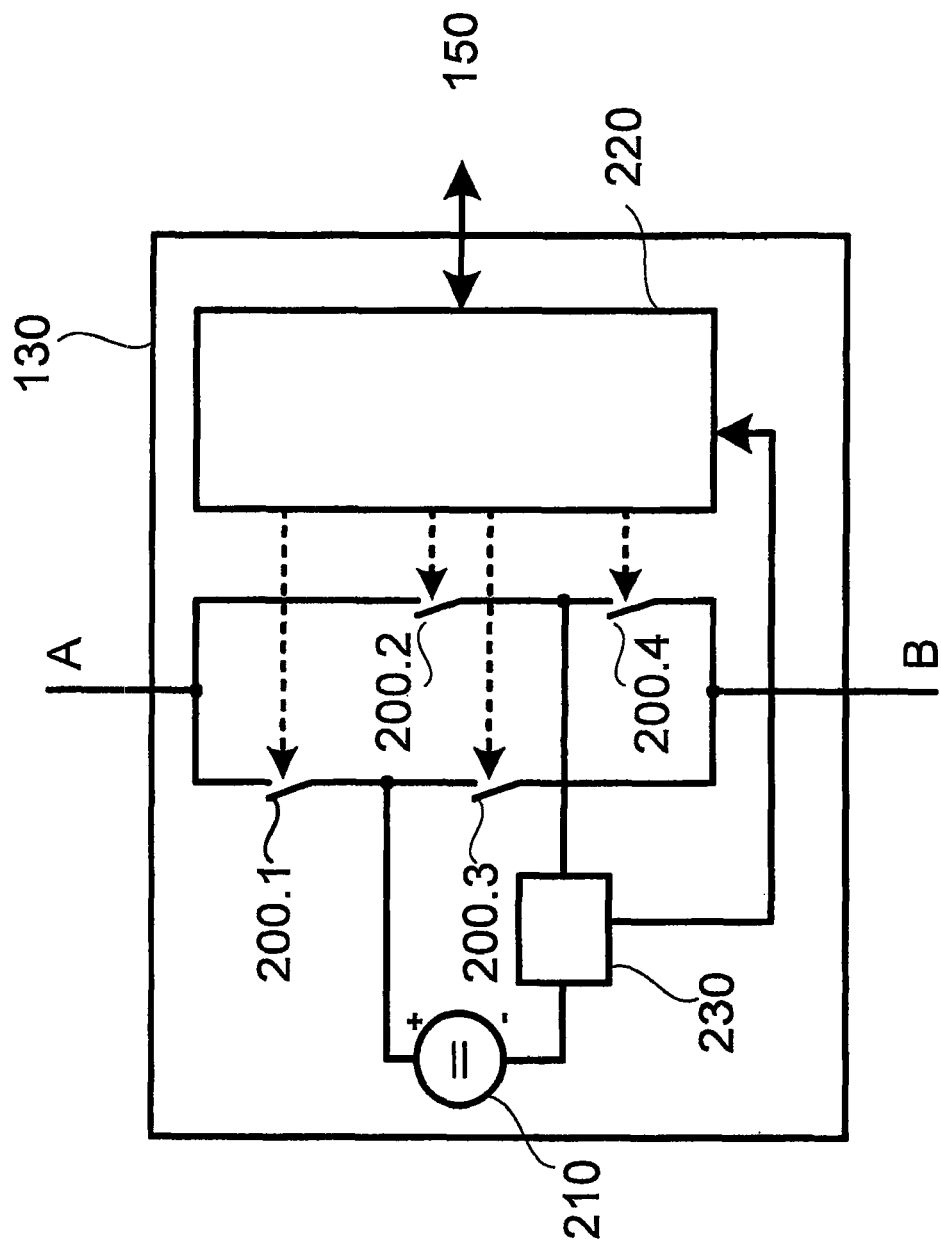
FIG. 3 a block diagram of an example embodiment of a charge unit.

FIG. 3 shows a block diagram of a charge unit 130, which is suitable for generating the signal characteristic of a charge mode described in FIG. 2, or for carrying out the method that forms its basis. It may be included in the device illustrated in FIG. 1, for example.

In order to be able to switch a charge voltage with different polarities to line pair 110, a switching device, e.g., in the form of four switch elements 200.1, 200.2, 200.3, 200.4 is provided. They are interconnected such that the positive pole and the negative pole of a voltage source 210 are able to be switched to an output A and B in each case. Since charge unit 130 is separated from line pair 110 when switch elements 200.1, 200.2, 200.3, 200.4 are open, it may be possible to completely dispense with switching elements 120.1, 120.2 shown in FIG. 1. However, if it is necessary to separate communication unit 135 from line pair 110 in the charge mode, corresponding switching elements 120.1, 120.2 must be provided between communication unit 135 and line pair 110. For example, the switch elements provided as MOSFET transistors, which are interconnected into a, e.g., conventional, H-bridge circuit. Switch elements 200.1, 200.2, 200.3, 200.4 are actuated by a charge-control unit 220 via corresponding control lines, according to the required polarity of the charge voltage.

A zero-crossing detector 230 is connected between one of the two outputs of voltage source 210, preferably the negative pole, which is usually at a reference potential of control unit 110, and the corresponding connection at the H-bridge circuit. Criteria for a current zero crossing may be, for example, the detection of a reversal of the current direction, or an undershooting of a voltage drop at a current-measuring resistor that is connected in series with the output of the voltage source. If a current zero crossing is detected, this will be signaled to charge-control unit 220.

The charge process in charge mode may thus be summarized as follows:

At the end of the communication mode, processing unit 150 signals the start of the charge mode to charge-control unit 220 and possibly switches switching elements 120.1, 120.2 such that charge unit 130 is connected to line pair 110.

Charge-control unit 220 switches voltage source 210 to outputs A and B in a first polarity in that it actuates switch elements 200.1, 200.2, 200.3, 200.4 correspondingly.

Following a defined time $T_P$, charge-control unit 220 reverses the polarity of the voltage source via switch elements 200.1, 200.2, 200.3, 200.4.

After zero-crossing detector 230 has indicated a current zero crossing, charge-control unit 220 switches the charge voltage off by opening switch elements 200.1, 200.2, 200.3, 200.4 and signals the end of the charge mode to processing unit 150. Processing unit 150 then separates line pair 110 from charge unit 130, if appropriate.

The system described herein is especially suitable for position-measuring devices 10 that are arranged as so-called rotary encoders and installed directly in electric motors in order to measure the angular position and/or the rotational speed of the engine shaft. Since no more than one line pair 110 is required to operate position-measuring device 10, it is easily possible to integrate it, possibly provided with a shield, in the motor cable needed for the actuation of the electric motor as it is. That is to say, a separate cable for position-measuring device 10 is able to be saved. Due to the fact that an interference-free differential data transmission is able to be provided notwithstanding the minimized number of lines required for the communication, high data-transmission reliability may be achieved even in the critical environment of the engine cable and for large cable lengths.

It is of course understood that the system is not restricted to this type of use, but may instead be utilized in other fields as well.

What is claimed is:

1. A device for transmitting energy between a control unit and a position-measuring device via a line pair in a charge mode and for transmitting data between the control unit and the position-measuring device via the line pair in a communication mode, comprising:
   an energy storage device arranged in the position-measuring device, the energy storage device being chargeable by the line pair in the charge mode and adapted to supply energy to the position-measuring device in the communication mode;
   a charge unit arranged in the control unit; and
   a switching device arranged in the control unit and adapted to connect the charge unit to the line pair in a two-pole manner in the charge mode.

2. The device according to claim 1, further comprising:
   a charge-control unit arranged in the charge unit; and switch elements;
   wherein the charge-control unit is adapted to actuate the switch element to output a voltage of a voltage source, for charging the energy storage device, with two polarities.

3. The device according to claim 2, further comprising a zero-crossing detector arranged in the charge unit and adapted to determine a current zero crossing of the charge current and to signal the current zero crossing to the charge-control unit.

4. The device according to claim 1, further comprising a rectifier unit arranged in the position-measuring device, between the energy storage device and the line pair.

5. The device according to claim 1, further comprising an evaluation unit arranged in the position-measuring device and adapted to detect an end of the charge mode by analyzing voltage levels or a time characteristic of signals between lines of the line pair.

6. A system, comprising:
   a position-measuring device;
   a control unit;
   a line pair connected to the position-measuring device and to the control unit; and
   a device adapted to transmit energy between the control unit and the position-measuring device via the line pair in a charge mode and to transmit data between the control unit and the position-measuring device via the line pair in a communication mode, including:
      an energy storage device arranged in the position-measuring device, the energy storage device being chargeable by the line pair in the charge mode and adapted to supply energy to the position-measuring device in the communication mode;
      a charge unit arranged in the control unit; and
      a switching device arranged in the control unit and adapted to connect the charge unit to the line pair in a two-pole manner in the charge mode.

7. A method, comprising: for transmitting energy and data between a control unit and a position-measuring device via a line pair, comprising:
   in a charge mode, transmitting energy between a control unit and a position-measuring device via a line pair;
   in a communication mode, transmitting data between the control unit and the position-measuring device via the line pair;
   in the charge mode, charging, via the line pair, an energy storage device provided in the position-measuring device;
   in the communication mode, supplying energy to the position-measuring device;
   in the charge mode, connecting a charge unit, provided in the control unit, to the line pair in a two-pole manner by a switching device.

8. The method according to claim 7, further comprising separating the line pair from the charge unit by the switching device at an end of the charge mode.

9. The method according to claim 7, further comprising actuating switching elements by a charge-control unit, arranged in the charge unit, to reverse, at least once in each charge state, a polarity of a charge voltage output by the charge unit to charge the energy storage device.

10. The method according to claim 9, further comprising:
    detecting, by a zero-crossing detector arranged in the charge unit, a current zero crossing of a charge current triggered by the polarity reversal of the charge current; and
    signaling the current zero crossing to the charge-control unit.

11. The method according to claim 7, further comprising detecting, by an evaluation unit arranged in the position-measuring device, an end of the charge mode by analyzing voltage levels or a time characteristic of signals between lines of the line pair.

* * * * *